3,557,103
2-PHENYL-4-TERTIARYAMINOLOWERALKYL-
2H-1,4-BENZOXAZIN-3(4H)-ONES
Ivan C. Nordin, Ann Arbor, Mich., assignor to Parke,
Davis & Company, Detroit, Mich., a corporation of
Michigan
No Drawing. Filed July 18, 1968, Ser. No. 745,695
Int. Cl. C07d 87/48
U.S. Cl. 260—244                                 7 Claims

ABSTRACT OF THE DISCLOSURE

Novel benzoxazinone free base (I) and acid addition salt compounds

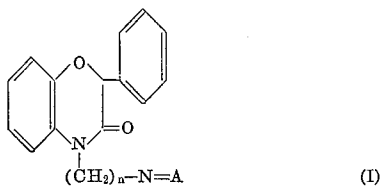

$$(CH_2)_n-N=A \quad (I)$$

are provided by condensing 2-phenyl-2H-1,4-benzoxazin-3(4H)-one with the appropriate aminoalkyl side chain in either one or two steps where $n$ is 3, 4 or 5 and —N=A is a diisopropylamino, 2,5-dimethyl-1-pyrrolidinyl or 2,6-dimethylpiperidino group. The products have pharmacological properties and are useful anti-arrhythmic agents.

SUMMARY AND DETAILED DESCRIPTION

This invention relates to novel benzoxazinone compounds and acid addition salts thereof having in free base form the formula

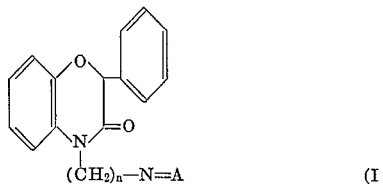

$$(CH_2)_n-N=A \quad (I)$$

and to means for producing the same, where $n$ is the integer 3, 4 or 5 and —N=A is a diisopropylamino group or a 2,5-dimethyl pyrrolidinyl or 2,6-dimethylpiperidino group.

The compounds of the invention can be prepared by reacting 2-phenyl-2H-1,4-benzoxazin-3-(4H)-one and a halopropyl amine of formula X—(CH$_2$)$_3$—N=A in the presence of a base and an inert solvent; where —N=A has the foregoing significance and X is a holgen atom, preferably a bromine atom. A suitable base for the reaction is an alkali metal triphenylmethide, hydride or amide. Sodium hydride is a preferred base for the reaction. Suitable solvents for the reaction include aromatic hydrocarbons, dimethylformamide, dimethylsulfoxide, ethers and the like. Dimethylsulfoxide is a preferred solvent. Equivalent amounts of the reactants are generally used although the benzoxazine starting material may be employed in excess if desired. The reaction proceeds ordinarily at temperatures ranging from 0–60° C. over a period of 2–48 hours. According to one procedure which is preferred, the reaction is carried out at room temperature for periods of about 16–18 hours.

The compounds of the invention can also be prepared by reacting a 4-(omega-halo-C$_3$ to C$_5$-alkyl)-2-phenyl-2H 1,4-benzoxazin-3-(4H)-one with diisopropylamine or with 2,5-dimethyl-1-pyrrolidine or 2,6-dimethylpiperidine. The reaction can be carried out with or without added solvent. Suitable solvents for the reaction include aromatic hydrocarbons, ethers, lower alkanols and alkanones, tertiary amides, acetonitrile and the like. Toluene is a preferred solvent. The amine reactant when employed in excess can be used as a solvent. In this regard it eliminates the need for a special solvent and additionally serves as an acid-binding substance. The ratio of the reactants can be varied considerably. Ordinarily, at least one equivalent of the amine is employed and preferably an excess of the amine, particularly a 3 to 5 mole excess, is used. The reaction is ordinarily carried out at temperatures ranging from 0–175° C. for about 1–72 hours. Preferably the reaction is carried out at the reflux temperature of the reaction mixture.

The compounds of the invention are useful pharmacological agents. In particular they are useful anti-arrhythmic agents capable of restoring normal cariac rhythm; the compounds are administered by the intravenous route or the intramuscular route. The activity of the compounds can be demonstrated in standard art-recognized laboratory tests such as the Harris technique. A complete description of the Harris technique is given in Circulation 1:1318–28 (1950). Similar procedures or adaptations are reported in the Annals of the New York Academy of Sciences 64:543–551 (1956) and Archives Internationales de Pharmacodynamie et de Therapie 147:69–75 (1964). By this test, using dogs as testing animals, the compounds of the invention uniformly provide substantially complete reversion to normal cardiac rhythm at low dosage of the order of 2.5 mg./kg. by the intravenous route. In this regard, the compounds are about 10 times more active than quinidine sulfate, a standard drug for treatment of cardiac arrhythmias.

The invention is illustrated by the following examples.

EXAMPLE 1

(a) A solution of 4-(3-bromopropyl)-2-phenyl-2H-1,4-benzoxazin-3(4H)-one (21.7 g.), 19.2 g. of diisopropylamine and 50 ml. of toluene is stirred at reflux for 18 hours. The mixture is then cooled and acidified with dilute hydrochloric acid. The aqueous layer, together with the water and toluene insoluble layer, is separated and made alkaline with 50% aqueous sodium hydroxide. The alkaline mixture is extracted with toluene and the extracts are dried over anhydrous magnesium sulfate and concentrated. The residual product, 4-[3-(diisopropylamino)propyl]-2-phenyl - 2H - 1,4-benzoxazin-3(4H)-one, is recovered in pure form as the fraction distilling at 168–169° C. at 0.10 mm. of mercury.

(b) The starting material for the reaction is prepared as follows:

A mixture of 967 g. of potassium carbonate and 3.5 liters of dimethylformamide is stirred 15 minutes and then treated with 974 g. of o-nitrophenol. After stirring 15 minutes at 80–90° C., this mixture is cooled to 48° C. for addition of 1872 g. of ethyl 2-bromo-2-phenylacetate. The resulting mixture is stirred 20 minutes more and then heated at 70° C. for one-half hour before it is poured, with stirring into 72 liters of water. After standing one and one-half hours, the precipitate is collected and melted under 12 liters of water. On stirring and cooling, the solid which forms, ethyl 2-o-nitrophenoxy-2-phenylacetate, is recrystallized from methanol; M.P. 62–63.5° C.

A mixture of 500 g. of ethyl 2-o-nitrophenoxy-2-phenylacetate, 3 liters of methanol, 1 liter of tetrahydrofuran, and 30 g. of Raney nickel is hydrogenated at 60 p.s.i. until the required amount of hydrogen is absorbed. Filtration, followed by concentration, yields 2-phenyl-2H-1,4-benzoxazin-3(4H)-one; M.P. 166.5–168° C. after recrystallization from absolute ethanol.

A mixture of 5.8 g. of lithium amide, 57 g. of 2-phenyl-2H-1,4-benzoxazin-3(4H)-one, and 300 ml. of dimethylformamide is heated at 70° C. for 2 hours, the last one and one-half hours of which are conducted under a mild vacuum (≈ 300 mm.). At this point, 204 g. of 1,3-dibromopropane is added as rapidly as possible and the resulting mixture heated at 100° C. overnight. The mixture is then concentrated, diluted with water, and extracted with toluene. Concentration of the extracts yields 4-(3-bromopropyl)-2-phenyl-2H-1,4-benzoxazin-3(4H)-one.

(c) By following the procedure of paragraph 1(a) but using 25 g. instead of 2.17 g. of the benzoxamine starting material and replacing the diisopropylamine with 16.5 g. of 2,5-dimethylpyrrolidine, the product obtained is 4-[3-(2,5-dimethyl-1-pyrrolidinyl)propyl] - 2 - phenyl - 2H-1,4-benzoxazin-3(4H)-one; B.P. 174–175° C. at 0.12 mm. of mercury.

Also, by the same procedure but starting with 18.7 g. of 4-(5-bromopentyl)-2-phenyl-2H-1,4-benzoxazin-3(4H)-one and 15.2 g. of diisopropylamine, the product obtained is 4-[5-(diisopropylamino)pentyl]-2-phenyl-2H-1,4-benzoxazin-3(4H)-one; B.P. 193–195° C./0.15 mm.; similarly, the benzoxazinone starting material is obtained by the general procedure of Example 1(b). 4-[5-(2,5-dimethyl-1 - pyrrolidinyl)pentyl] - 2 - phenyl - 2H-1,4-benzoxazin-3(4H)-one, B.P. 195–197° C./0.08 mm., and 4-[5-(2,6-dimethylpiperidino)pentyl]-2-phenyl - 2H - 1,4-benzoxazin-3(4H)-one, B.P. 204–205° C./0.10 mm., are prepared from one part of the benzoxazinone and three parts of 2,5-dimethylpyrrolidine and 2,6-dimethylpiperidine, respectively.

EXAMPLE 2

A mixture of 11.2 g. of 2-phenyl-2H-1,4-benzoxazin-3-(4H)-one and 15 ml. of dimethyl sulfoxide stirred at 25–30° C. is treated first with 4.3 g. of a 58% sodium hydride mineral oil dispersion and then with 11.9 g. of 3-(2,6-dimethylpiperidino) - propyl chloride hydrochloride. The resulting mixture is stirred at room temperature overnight and is then diluted with 200 ml. of water and extracted with toluene. The extracts are washed with water, dried over anhydrous magnesium sulfate and concentrated under vacuum. The product, 4-[3-(2,6-dimethylpiperidino)propyl]-2-phenyl-2H-1,4 - benzoxazin-3(4H)-one, is obtained as the fraction distilling at 210–212° C. and 0.12 mm. of mercury.

I claim:
1. Benzoxazinone compounds having the formula

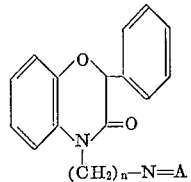

where $n$ is 3, 4 or 5 and —N=A is a diisopropylamino or a 2,5 - dimethylpyrrolidinyl or 2,6 - dimethylpiperidino group.

2. A compound according to claim 1 which compound is 4 - [3 - (diisopropylamino)propyl] - 2-phenyl-2H-1,4-benzoxazin-3(4H)-one.

3. A compound according to claim 1 which compound is 4 - [3 - (2,5-dimethyl-1-pyrrolidinyl)propyl]-2-phenyl-2H-1,4-benzoxazin-3(4H)-one.

4. A compound according to claim 1 which compound is 4 - (3 - [2,6-dimethylpiperidino)propyl]-2-phenyl-2H-1,4-benzoxazin-3(4H)-one.

5. A compound according to claim 1 which compound is 4 - [5 - (diisopropylamino)pentyl] - 2-phenyl-2H-1,4-benzoxazin-3(4H)-one.

6. A compound according to claim 1 which compound is 4 - [5 - (2,5-dimethyl-1-pyrrolidinyl)pentyl]-2-phenyl-2H-1,4-benzoxazin-3(4H)-one.

7. A compound according to claim 1 which compound is 4 - [5 - (2,6-dimethylpiperidino)pentyl]-2-phenyl-2H-1,4-benzoxazin-3(4H)-one.

References Cited

UNITED STATES PATENTS 3,401,166  9/1968  Krapcho _____ 260—243

OTHER REFERENCES

Kurihara et al.: Tohoku Yakka Daigaku Kiyo 9, 77–81 (1962).

Sugimoto et al.: Yakugaku Kenkyu 34, 100–6 (1962).

HENRY R. JILES, Primary Examiner

G. T. TODD, Assistant Examiner

U.S. Cl. X.R.

424—248